United States Patent [19]
Schied et al.

[11] 3,848,542
[45] Nov. 19, 1974

[54] SAFETY SHIELD

[75] Inventors: Thomas Schied, Philadelphia; Edward J. Wright, Warrington, both of Pa.

[73] Assignee: Sherman Car Wash Equipment Co., Palmyra, N.J.

[22] Filed: Oct. 15, 1973

[21] Appl. No.: 406,739

[52] U.S. Cl. .............................. 104/172 B, 198/168
[51] Int. Cl. ............................................. B61b 13/00
[58] Field of Search ............ 104/172 R, 172 B, 279, 104/172 C; 198/168, 171, 175, 176

[56] References Cited
UNITED STATES PATENTS 3,260,219   7/1966   Vani .............................. 104/172 B
3,596,606   8/1971   Smith et al. ..................... 104/172 B Primary Examiner—Lloyd L. King
Assistant Examiner—Randolph A. Reese
Attorney, Agent, or Firm—Seidel, Gonda & Goldhammer

[57] ABSTRACT

A safety shield which can be mounted on a dolly used in an automobile conveyor. The shield comprises two ears which support a guard. The ears are placed over the existing lugs on the conveyor with the guard adjacent the roller portion of the dolly and the conveyor floor.

8 Claims, 4 Drawing Figures

PATENTED NOV 19 1974 3,848,542

SAFETY SHIELD

This invention relates to a safety shield and more particularly to a safety shield which can be mounted on a dolly in an automobile conveyor.

In automatic car washing plants the automobiles are moved through the plant by automatic conveyors. Typically, the conveyors comprise two spaced chains which support a dolly therebetween. The dolly may have a roller rotatably mounted thereon. The roller engages one of the wheels of the automobile thereby moving the automobile through the car wash plant.

There is concern that things may be drawn beneath the roller thereby damaging the dolly or causing serious injury to persons moving about in the area of the conveyor. Thus, it is desirable to have a suitable safety mechanism which may be readily attached to existing conveyors and which may be readily removed therefrom to permit easy replacement and servicing.

Furthermore, such a safety device should preferably be in the form of a shield extending parallel to the roller and being located relatively close to the lower most portion thereof to effectively provide a shield which would prevent articles from being caught beneath it.

Accordingly, the invention generally relates to a safety shield for a conveyor dolly which is mountable over the lugs of an automobile conveyor and which comprises first and second ears which support a guard so that it extends along the roller of the dolly.

For the purpose of illustrating the invention, there is shown in the drawings a form which is presently preferred; it being understood, however, that this invention is not limited to the precise arrangements and instrumentalities shown.

Figure 1:
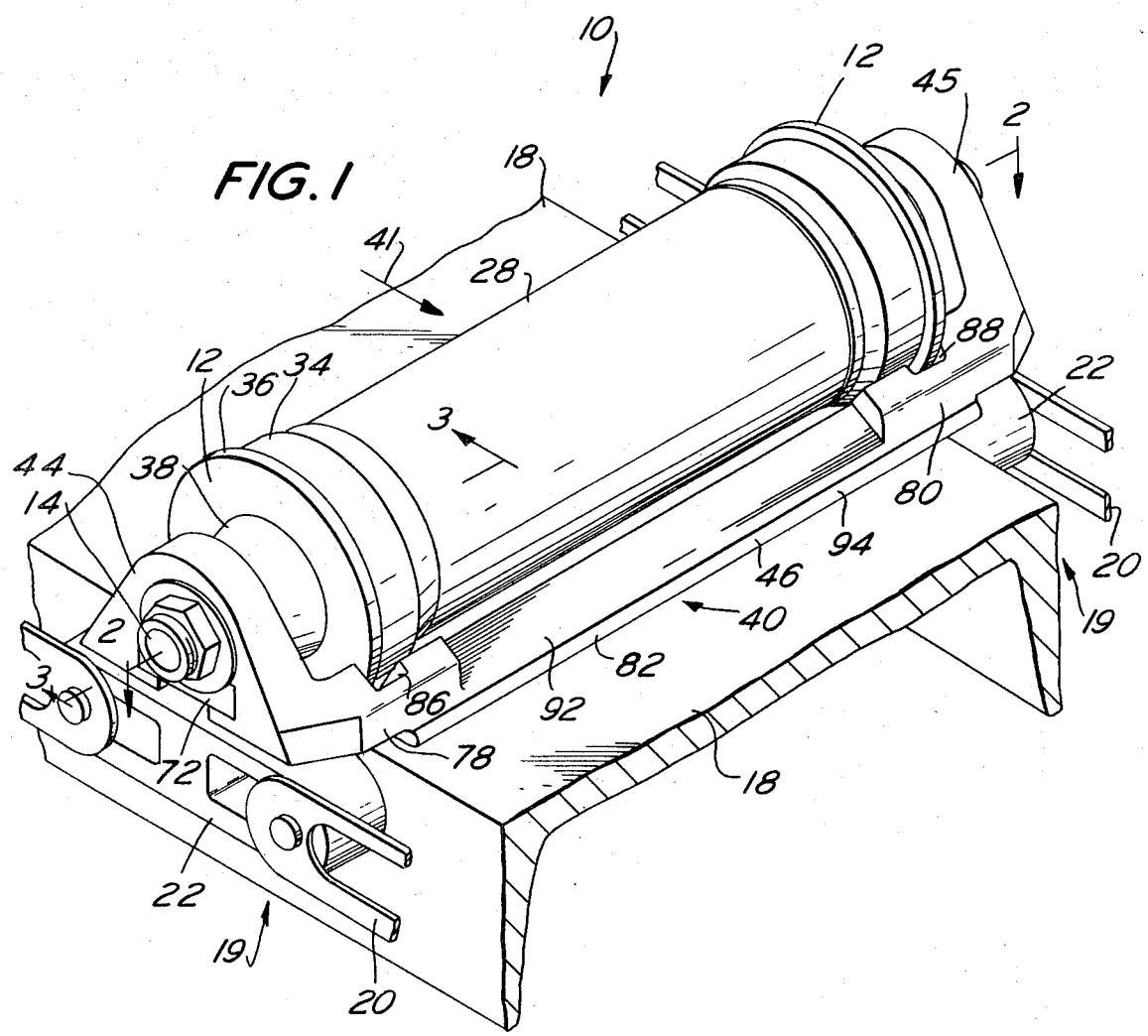
FIG. 1 is a perspective view of a safety shield mounted on a dolly on an automobile conveyor.

Referring to the drawings in detail, FIG. 1 illustrates a portion of a typical automobile conveyor of the type used in car wash plants. The conveyor is provided with a number of dolly assemblies 10, one of which is shown. The dolly assemblies are pulled by the conveyor along the conveyor path. They engage the tires of an automobile to roll the automobile through the car wash plant.

A typical conveyor and dolly assembly 10 is described in detail in Smith, Jr. and Verhagen U.S. Pat. No. 3,596,606 of Aug. 3, 1971. As described in that patent, the dolly assembly 10 comprises two wheels 12 which support a shaft 14. The wheels 12 are engageable with track 18 and are supported thereon. The automobile tires move along the track 18. In a recess 19 to the outside of the track 18 is a conveyor chain 20. The dolly assembly is connected to the conveyor chains 20 at spaced intervals by links 22. Each link 22 has an upwardly directed lug 24 in which shaft 14 is received.

A pusher roller 28 is rotatably mounted on shaft 14 between wheels 12 by bushings 30.

Each wheel 12 comprises a hub 34 which is in rolling contact with track 18 and a radially directed flange 36 to assure that it remains on the track.

An outwardly directed frustro-conical protrusion 38 on each hub (FIG. 3) spaces the lugs 24 and chain 20 outwardly from the track 18 and hub 34.

The conveyor chains 20 and dolly assemblies 10 are moved along the track 18 in the direction indicated by the arrow 41 by appropriate means (not shown). When a pusher roller 28 engages a tire, the tire is rolled along the conveyor track 18 while the pusher roller 28 rotates about shaft 14 in the direction indicated by arrows 43.

The safety shield 40 comprises two ears 44 and 45 which are spaced from each other a distance sufficient to overly the parts of shaft 14 which extend past protrusions 38. As both ears 44 and 45 are mirror images of each other, only ear 44 will be described in detail, it being understood that ear 45 has the same construction. A guard 46 extends between ears 44 and 45. When the safety shield is mounted on the dolly assembly the guard 46 closes the space between the bottom portion of the pusher roller 28 and the conveyor track 18.

Figure 4:
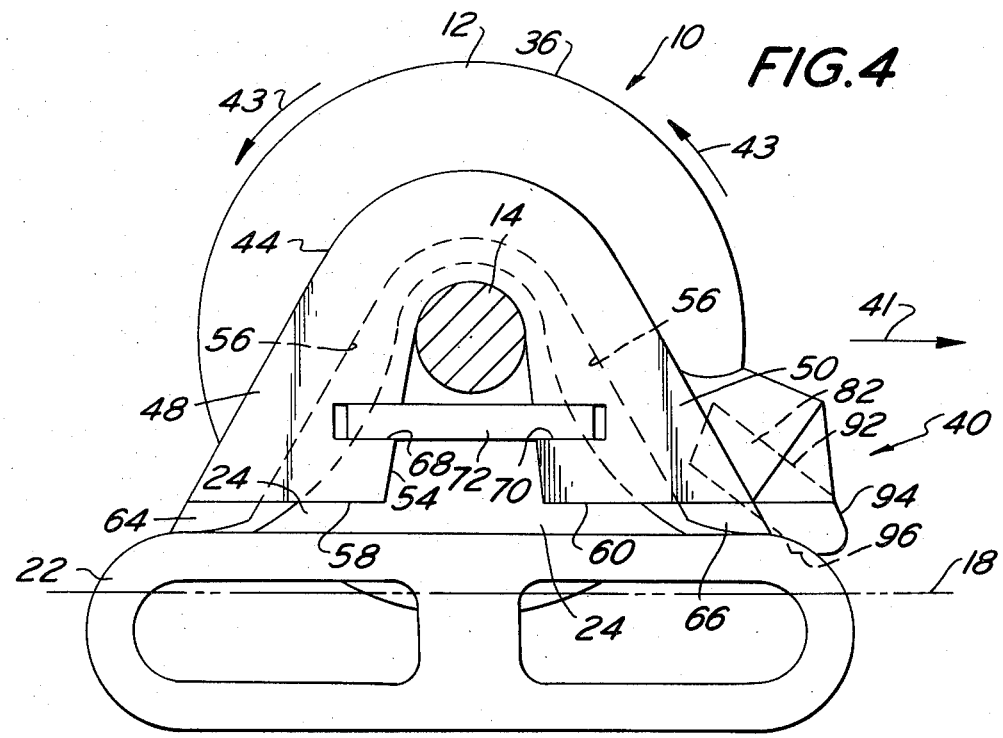
FIG. 4 is a side elevation view taken along line 4—4 of FIG. 3.

As best seen in FIG. 4, ear 44 is generally U-shaped in that it comprises two downwardly directed legs 48 and 50. The legs define a slot 54 which is closed at its upper end. The ear can be slipped over shaft 14 with the shaft resting against the closed end of the slot. The ear has an inwardly directed lip 56 on its periphery which covers lug 24 and provides a rigid support for the guard 46 as will become apparent.

The length of each leg 48 and 50 is such that their lower surfaces 58 and 60 are spaced slightly above link 22. However, a portion of each leg extends downwardly from its lower surface to define stops 64 and 66. The stops engage the top surface of each link 22 to prevent rotation of the safety shield about shaft 14.

Each of the ears 44 and 45 may be retained on the shaft 14 by appropriate means. Preferably, the retaining means should permit easy installation and removal of the safety shield on an existing conveyor. Thus, as illustrated in FIG. 4, ear 44 includes slots 68 and 70 in legs 48 and 50 respectively. The aforementioned slots are oppositely directed and in communication with slot 54.

The slots 68 and 70 are spaced from the closed end of slot 54. An elongated retaining member 72 which preferably is a rectangular bar is received within slots 68 and 70 to confine shaft 14 in the closed end of slot 54.

Figure 3:
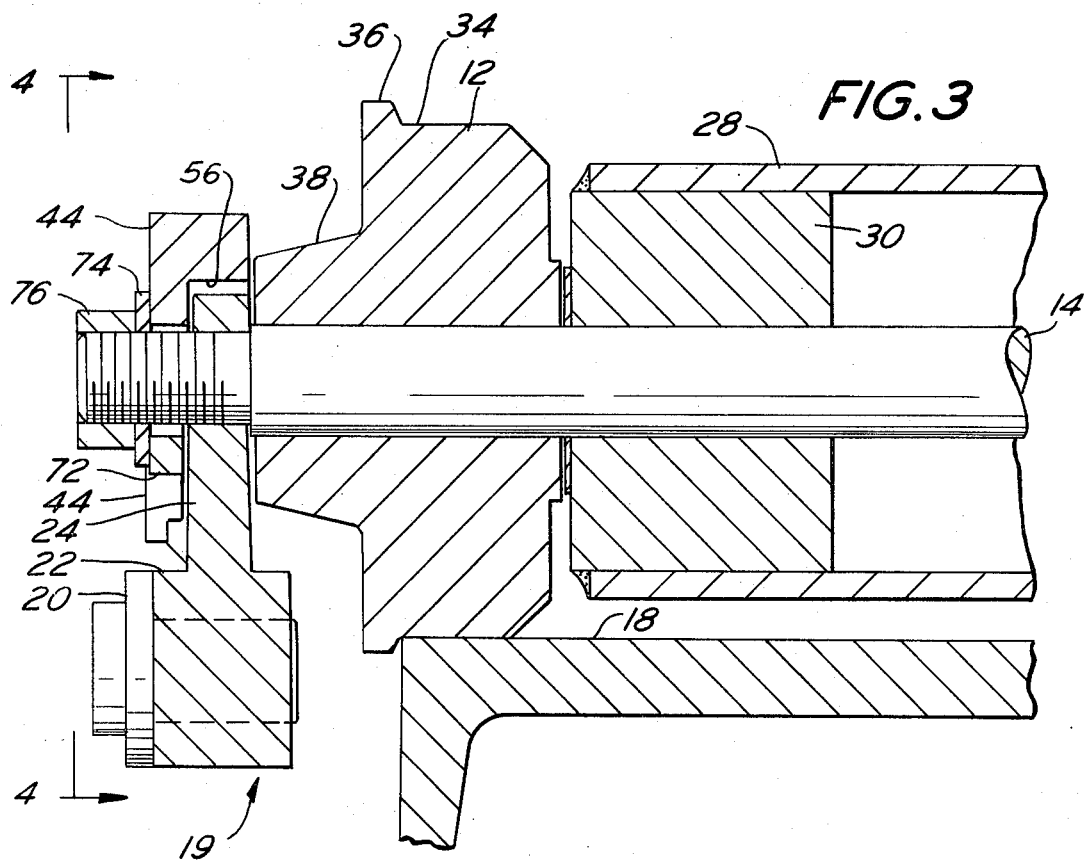
FIG. 3 is a sectional view taken along line 3—3 of FIG. 1.

As shown in FIG. 3, member 72 is retained in position by suitable connecting means on the outside of the ear such as a washer 74 and a nut 76. On the other side of the ear, the retaining member is held in position by engagement with lug 24.

The guard 46 comprises outer portions 78 and 80 and an intermediate portion 82. Each of the outer portions is connected to leg 50 on each of the ears 44 and 45. The outer portions support intermediate portion 82.

Figure 2:
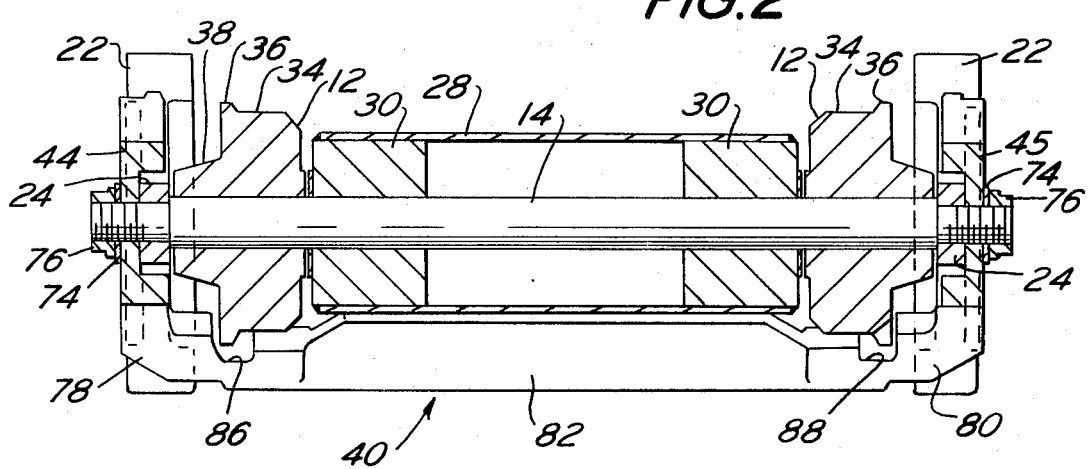
FIG. 2 is a sectional view taken along line 2—2 of FIG. 1.

Referring to FIGS. 1 and 2, each of the outer portions 78 and 80 have notches 86 and 88 in facing relation to the dolly assembly. The notches receive flanges 36 so that the shield can be placed close to the pusher roller 28.

The lower surfaces of the outer members 78 and 80 are substantially coplanar with the aforementioned lower surfaces 58 and 60.

Referring to FIG. 4, the intermediate portion 82 of the guard is seen in phantom. It comprises first and second upper surfaces 92 and 94 which slope upwardly and toward the pusher roller 28 and a lower surface 96. The intermediate portion of the guard extends below the outer members 78 and 80 so that its lower surface is in substantially the same horizontal plane as the lower portion of the roller.

Thus, an item laying on the conveyor track 18 would tend to be pushed out of the path of the dolly assembly by intermediate portion 82. Further, the positioning of upper surfaces 92 and 94 toward the roller tends to move an obstructing object over the pusher roller 28 so that the conveyor is not jammed. In the event that an item slips under intermediate portion 82, it will also pass under the pusher roller 28.

As best seen in FIG. 3, the intermediate portion 82 is supported by ears 44 and 45 so that it is disposed below the horizontal axis of the pusher roller 28. Thus, an automobile tire can be engaged by the pusher roller even though the safety shield is supported thereon.

Since the bottom surfaces of the ears and outer portions are higher than the bottom surface of the intermediate portion, the intermediate portion can function as an effective blocking member while at the same time the outer portions and ears do not interfere with the links 22.

Assembly or removal of a safety shield on a dolly assembly is simple and can be accomplished with hand tools.

For example, to remove the safety shield from the dolly assembly illustrated in the drawing, nut 76 and washer 74 are removed from each end of shaft 14. Each of the retaining members 72 is removed from its respective slots 68 and 70. The safety shield can then be easily lifted from over the shaft 14. The washers 74 and nuts 76 may then be replaced on the shaft 14.

Attachment of the safety shield onto existing dolly assemblies is accomplished by merely placing the ears 44 and 45 over the ends of 14 so that they are supported at the end of slots 54. The retaining members 72 are placed in their respective slots 68 and 70 and the nut and washer are installed at each end of shaft 14.

While the invention has been described with reference to one guard on the dolly assembly, it is apparent that the shield can be formed with a guard on the opposite side so that only one safety shield need be mounted on a dolly assembly for protection in the event that conveyor movement is to be in forward and reverse directions through the car wash plant.

While the invention has been described with reference to certain forms thereof, it is apparent that other forms and embodiments thereof will be obvious to those skilled in the art in view of the foregoing description. Thus, the scope of the invention should not be limited by that description but, rather by the scope of the claims appended hereto.

We claim:

1. A safety shield for a conveyor dolly of the type which comprises two spaced links with upwardly extending lugs, said lugs supporting a shaft on which means for rolling engagement with the wheel of an automobile is mounted, said safety shield comprising first and second ears and a guard, each of said ears being generally U-shaped and comprising two legs which are for overlying the lugs, said legs defining a first slot therebetween for receiving the shaft on which the roller is supported, said first slot being closed at at least one end, and said guard comprises an elongated member, said member being supported by said ears so that it extends along said means for rolling contact.

2. A safety shield as defined in claim 1 wherein said guard is supported by said ears below the horizontal axis of said roller.

3. A safety shield as defined in claim 1 wherein each of said legs on said ears has a bottom surface, stop members depending from said bottom surfaces, said stop members being operative to engage the links and thereby prevent rotation of said safety shield about said shaft.

4. A safety shield as defined in claim 1 including means for closing the other end of each of said first slots to retain said ears on a shaft extending therethrough.

5. A safety shield as defined in claim 4 wherein said closing means includes a second slot in each of said legs in each of said ears, said slots in said legs in each ear being oppositely directed and in communication with the first slot defined therebetween, said second slots being spaced from the closed end of said first slots, and elongated means receivable in said second slots in each of said ears, said last named means being operative to close said first slots in each of said ears.

6. A safety shield as defined in claim 1 wherein said elongated member comprising said guard has upper and lower surfaces, said upper surface being directed generally upwardly and toward the axis of the means for rolling engagement, and at least a portion of said lower surface lies in a substantially horizontal plane that passes through the bottom of the means for rolling engagement.

7. A safety shield as defined in claim 1 wherein said ears have inwardly directed lips which overly the lugs when said shield is mounted thereon.

8. A safety shield as defined in claim 1 wherein said guard includes two outer portions and an intermediate portion, each of said outer portions connecting said intermediate portion to one of said ears, said intermediate portion and said outer portions having bottom surfaces, and the bottom surface of said intermediate portion is lower than the bottom surface of said outer portion to permit said outer portions to be spaced above the lugs when the shield is mounted on the dolly.

* * * * *